(12) United States Patent
Scheinert

(10) Patent No.: US 7,450,939 B2
(45) Date of Patent: Nov. 11, 2008

(54) INTERNET BASE STATION WITH A TELEPHONE LINE

(75) Inventor: Stefan Scheinert, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/913,652

(22) Filed: Aug. 6, 2004

(65) Prior Publication Data

US 2005/0068943 A1 Mar. 31, 2005

Related U.S. Application Data

(63) Continuation-in-part of application No. 10/280,733, filed on Oct. 25, 2002, now Pat. No. 7,117,015, and a continuation-in-part of application No. 10/264,463, filed on Oct. 3, 2002.

(60) Provisional application No. 60/492,794, filed on Aug. 6, 2003, provisional application No. 60/327,098, filed on Oct. 3, 2001.

(51) Int. Cl.
*H04Q 7/20* (2006.01)

(52) U.S. Cl. .............. 455/426.2; 455/428; 455/414.1; 455/432.2; 370/352; 370/328

(58) Field of Classification Search .............. 455/417, 455/554.1, 554.2, 557, 558, 415, 463, 432.2, 455/436, 435.2, 439, 445, 414.1, 432.1, 435.1, 455/41.2, 411, 410, 438; 370/352, 335, 522, 370/338, 401, 466, 328; 379/172, 142.07
See application file for complete search history.

(56) References Cited

U.S. PATENT DOCUMENTS

| | | | |
|---|---|---|---|
| 5,657,375 A * | 8/1997 | Connolly et al. ............ 455/436 |
| 5,787,344 A | 7/1998 | Scheinert | |
| 5,910,946 A | 6/1999 | Csapo | |
| 5,999,612 A * | 12/1999 | Dunn et al. ............ 379/212.01 |
| 6,128,496 A | 10/2000 | Scheinert | |
| 6,205,495 B1 * | 3/2001 | Gilbert et al. ................ 710/8 |
| RE37,820 E | 8/2002 | Scheinert | |
| 6,434,394 B1 * | 8/2002 | Grundvig et al. ............ 455/463 |
| 6,459,900 B1 | 10/2002 | Scheinert | |
| 6,591,114 B1 * | 7/2003 | Inbody ........................ 379/156 |
| 6,603,975 B1 | 8/2003 | Inouchi et al. | |
| 6,731,937 B1 * | 5/2004 | Spinner ....................... 455/445 |
| 6,751,207 B1 * | 6/2004 | Lee et al. .................... 370/338 |
| 6,795,444 B1 * | 9/2004 | Vo et al. ...................... 370/401 |
| 6,819,945 B1 * | 11/2004 | Chow et al. ................. 455/567 |
| 6,824,048 B1 * | 11/2004 | Itabashi et al. .............. 235/380 |
| 6,879,582 B1 * | 4/2005 | Dhara et al. ................. 370/352 |
| 6,930,987 B1 * | 8/2005 | Fukuda et al. .............. 370/328 |
| 6,970,710 B1 * | 11/2005 | Kikuchi ..................... 455/462 |
| 6,977,923 B1 * | 12/2005 | Hagebarth .................. 370/353 |

(Continued)

*Primary Examiner*—Tan Trinh
(74) *Attorney, Agent, or Firm*—Blakely, Sokoloff, Taylor & Zafman LLP

(57) ABSTRACT

A low power base station with a VOIP telephone line is used to combine fixed and wireless services, The device uses the Internet to communicate with a Mobile Switching Center, The base station is configured to connect to the Internet at a user-selected location and establishes a small area of wireless coverage within a greater macrocell network and providing a fixed line connection for the analog telephones at home or in the office.

15 Claims, 2 Drawing Sheets

U.S. PATENT DOCUMENTS

| | | | |
|---|---|---|---|
| 6,996,092 B1* | 2/2006 | Maguire et al. | 370/356 |
| 7,002,995 B2* | 2/2006 | Chow et al. | 370/485 |
| 7,010,002 B2* | 3/2006 | Chow et al. | 370/485 |
| 7,212,626 B1* | 5/2007 | Kobayashi | 379/354 |
| 7,295,836 B2* | 11/2007 | Yach et al. | 455/415 |
| 2001/0015968 A1* | 8/2001 | Sicher et al. | 370/352 |
| 2001/0029186 A1* | 10/2001 | Canyon et al. | 455/462 |
| 2001/0037372 A1* | 11/2001 | Tachi et al. | 709/217 |
| 2002/0022453 A1* | 2/2002 | Balog et al. | 455/41 |
| 2002/0044536 A1* | 4/2002 | Izumi et al. | 370/329 |
| 2002/0075846 A1 | 6/2002 | Valentine et al. | |
| 2002/0089951 A1* | 7/2002 | Hyun et al. | 370/335 |
| 2002/0107046 A1* | 8/2002 | Davis | 455/557 |
| 2002/0131387 A1 | 9/2002 | Pitcher et al. | |
| 2002/0191635 A1* | 12/2002 | Chow et al. | 370/463 |
| 2003/0012162 A1* | 1/2003 | Mukherjee et al. | 370/338 |
| 2003/0035525 A1* | 2/2003 | Wu et al. | 379/114.1 |
| 2003/0039239 A1* | 2/2003 | Ollis | 370/352 |
| 2003/0162544 A1* | 8/2003 | Austin et al. | 455/445 |
| 2003/0176186 A1* | 9/2003 | Mohammed | 455/432.1 |
| 2003/0224795 A1* | 12/2003 | Wilhoite et al. | 455/445 |
| 2004/0066776 A1* | 4/2004 | Ishidoshiro | 370/352 |
| 2004/0151293 A1* | 8/2004 | Jensen et al. | 379/114.02 |
| 2005/0002510 A1* | 1/2005 | Elsey et al. | 379/201.01 |
| 2005/0048958 A1* | 3/2005 | Mousseau et al. | 455/415 |
| 2005/0083959 A1* | 4/2005 | Binder | 370/419 |
| 2006/0160566 A1* | 7/2006 | Plahte et al. | 455/554.1 |
| 2006/0209795 A1* | 9/2006 | Chow et al. | 370/352 |
| 2007/0036306 A1* | 2/2007 | Pines et al. | 379/114.01 |
| 2008/0084869 A1* | 4/2008 | Hearty et al. | 370/352 |

* cited by examiner

INTERNET BASE STATION WITH A TELEPHONE LINE

RELATED APPLICATIONS

This application claims the benefit of U.S. provisional application No. 60/492,794, filed Aug. 6, 2003. This application is a continuation-in-part of U.S. non-provisional application Ser. No. 10/280,733, filed Oct. 25, 2002, and is also a continuation-in-part of U.S. non-provisional application Ser. No. 10/264,463, filed Oct. 3, 2002, which claims the benefit of U.S. provisional application Ser. No. 60/327,098, filed Oct. 3, 2001.

FIELD OF THE INVENTION

The present invention relates generally to radio or wireless communications and, more particularly, relates to a personal base station with an integrated telephone output for connection of analog or digital phones.

BACKGROUND OF THE INVENTION

In conventional communication networks, wireless phones and wire line phones are handled by different systems. Wireless phones are handled by wireless carriers and wire line phones are handled by local telephone companies. Long distance calls are sometimes handled by long distance service providers. This is a difficult scenario for users of both wireless and wire line phones, as they must deal with several service providers, several telephone numbers, and usually must pay a premium for use of multiple service providers. Another disadvantage is the separate distribution of call records in both systems.

A conventional telecommunications network is illustrated in FIG. 1. Mobile handset 1 communicates via wireless connection with base station 4. Base station 4 is connected to base station controller 5 via a dedicated line which forwards calls to mobile switching center 6. Switching center 6 routes calls to public switched telephone network (PSTN) 3. Hence, mobile handset 1 is able to reach any phone connected to PSTN 3. Wire line telephone 2 is also linked to PSTN 3. Even should wire line telephone 2 and mobile handset 1 belong to the same user, they will have different telephone numbers.

Some VoIP (Voice Over IP) providers offer IP telephones that are linked through the Internet to a VoIP gateway, as a substitute for an existing wire line phone. As an option the subscriber terminal can be an analog telephone adapter (ATA) with an analog interface so that standard analog phones can be connected to it. The ATA converts signals into VoIP messages and sends them through the Internet to the VoIP gateway.

U.S. application Ser. No. 10/280,733, filed Oct. 25, 2002 and having common assignee, proposes a potable, low power base station configured to convey wireless traffic between a mobile base station and a conventional wireless network via the Internet. The base station may be referred to as a "personal" or "Internet" base station ("iBS"), and is configured to connect to the Internet at a user-selected location and establishes a small area of wireless coverage within a greater macrocell network. The user sets the operating parameters of the base station. Here also, however, is a separation of mobile services and landline services. U.S. application Ser. No. 10/280,733 is incorporated by reference, and its subject matter has been published in corresponding International Publication No. WO 2004/040938.

U.S. application Ser. No. 10/264,463, filed on Oct. 3, 2002 and having common assignee, suggests use of a wireless local loop for connection of a landline telephone. The communications interface device or "homekit" of this application provides an interface between a mobile network and a land line phone. The homekit, however, is essentially a modified mobile with an RJ-11 output and uses costly wireless resources. U.S. application Ser. No. 10/264,463, published under publication no. US 2003/0134630 A1, is incorporated by reference.

SUMMARY OF THE INVENTION

The present invention combines a low power, personal base station as described in U.S. Ser. No. 10/280,733 with an ATA (analog telephone adaptor), which is a VoIP terminal with an RJ-11 output, to allow connection of any analog phone to the low power, personal base station. This new device is called VoIP-BS. The base station and ATA may be two different devices.

Other features, objects and implementations of the invention will be or will become apparent to one with skill in the art upon examination of the following figures and detailed description. All such additional features, objects and implementations are intended to be included within this description, to be within the scope of the invention and to be protected by the accompanying claims.

DETAILED DESCRIPTION OF THE INVENTION

Figure 1:
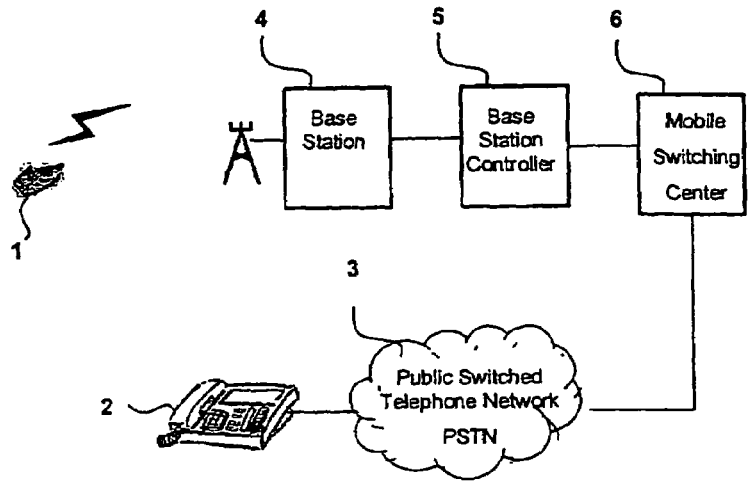
FIG. 1 is a diagram of a conventional telecommunications network.

The present invention combines a low power, personal base station as described in U.S. Ser. No. 10/280,733 with an ATA (analog telephone adaptor), which is a VoIP terminal with an RJ-11 output, to allow connection of any analog phone to the low power, personal base station. This new device is called VoIP-BS. The base station and ATA may be two different devices.

The VoIP-BS of the present invention is connected to a broadband modem at home, the office or anywhere else where wireless coverage is desired. It may use the public internet or a dedicated backhaul lines. It may have a digital output, so that ISDN phones or IP phones can be used.

A MSC (mobile switching center) can forward calls intended for a mobile to the VoIP-BS, so that an analog phone can be used instead. In this case the ATA functions are used (like a regular wire line phone). In another embodiment, a VoIP-gateway or soft switch is utilized rather than a MSC.

Trigger events that may cause the MSC to forward a mobile call to the VOIP-BS include:
  the mobile is switched off;
  the mobile is switched off in the home cell;
  the mobile is not reachable (e.g. no coverage or busy);
  the mobile is sending a signal to the VOIP-BS (i.e. via Bluetooth or other license-free standards), so it knows it is close by;
  the subscriber sends a message to the MSC (e.g. call forwarding on/off).

If the mobile is still reachable, the MSC will set up the call through the corresponding base station. In case the mobile is "at home", the personal base station will be used to communicate with the mobile.

In another embodiment of the invention, the mobile subscriber gets an ATA only, so that the mobile carrier can forward the calls over the Internet to the mobile subscriber's home or office. If call forwarding is not activated the mobile will be called through standard base stations.

The MSC can "mark" calls with the mobile's handset number (caller ID information) for outgoing calls through the VoIP-BS, and the VoIP-BS can handle multiple handsets. Hence, incoming calls may be displayed as "calling 858 123 4567 from 858 999 8888", or the like, in order to separate multiple mobile users by using the caller-ID information. In this connection, the VoIP-BS may have multiple RJ-11 lines, so that each mobile phone or group thereof has a separate line.

For outgoing calls, the user may enter a prefix to distinguish different mobile numbers in the same household or office. For example, "1" for dad; "2" for mom, "3" for kid and so on. The prefix may consist of one or more digits. The VOIP-gateway or MSC will translate the call as a call from "dad" or "mom", etc., which means it will show the corresponding mobile number as the originator.

Registration of mobiles can be done through the Internet by the subscriber. One or more mobiles may be assigned to a VOIP-BS. A prefix, as described above, can be assigned during registration and can be dependent on the number of mobiles registered. That is, if less than 10 mobiles are registered, only one digit is necessary, whereas if more than 10 mobile are registered two digits will be required. The grouping of mobile numbers and RJ-11 lines can be configured on the Internet by listing the RJ-11 lines and entering mobile numbers accordingly. Different ring tones may be programmed as well to distinguish different users.

In another embodiment, the MSC calls the mobile and its corresponding VOIP-BS simultaneously. The telephone answering first is used. In this connection, for example, if a fax is received on the VOIP-BS, the mobile may be notified of the fax by SMS (short message service).

Since many mobile handsets have multi-media capabilities, the VOIP-BS may be configured to send photos, videos, etc. to a PC or to a TV, and the audio signals to other devices, such as loudspeaker and microphones. This could facilitate video conferencing between mobiles and home equipment. For example, if one mobile is calling another mobile and the caller wants to do video conferencing, and the called party is at home and call forwarding is activated, the incoming call will be forwarded to the ATA function of the VOIP-BS. The video signal is forwarded to the TV (either via WiFi or dedicated lines) whereas the audio signals are forwarded to the loudspeaker of the TV. The video camera and the microphone are linked to the VOIP-BS so the base station can send the signals back to the originator of the call for display on his mobile, or on similarly configured audio/video equipment connected to his VOIP-BS.

Figure 2:
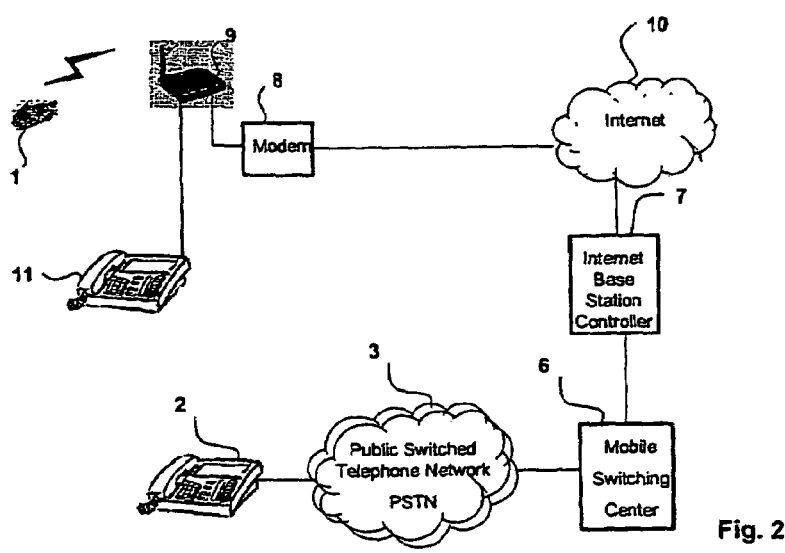
FIG. 2 is a diagram of a telecommunications network according to the present invention.

FIG. 2 is a diagram of a wireless and fixed line communications network according to the present invention. Mobile switching center (MSC) 6 connects to PSTN 3 and can reach any fixed telephone 2 connected to the PSTN 3. In accordance with the present invention, MSC 6 is connected to Internet base station controller (iBSC) 7 through dedicated lines. Internet base station controllers are described in detail in U.S. Ser. No. 10/280,733, which has been incorporated by reference. In brief, iBSCs function in a fashion similar to traditional BSCs, but they are connected to the Internet and control low power, personal Internet base stations (connected to the iBSC via a modem and the Internet) rather than traditional base stations.

Usually, iBSC 7 is co-located with MSC 6, and is linked to the Internet 10 and broadband modem 8. VOIP-BS 9 is linked to modem 8 through an Ethernet, USB or even wireless connection such as 802.11 or any other license free wireless standard. The VoIP-BS performs all base station functions for GSM (including GSM/GPRS and GSM/EDGE), CDMA and WDCDMA or UMTS.

If mobile station 1 sets up a call, the call is processed by VOIP-BS 9, which forwards the information to iBSC 7 and MSC 6. MSC 6 makes the corresponding connection in PSTN 3 and stores the records for the call.

If fixed subscriber 2 wants to call mobile station 1, he dials the mobile number which is sent to corresponding MSC 6. MSC 6 looks up the mobile number 1 in its HLR to identify the status and location of the mobile 1. If there is a trigger event as described in [16] above, the call is forwarded to the corresponding iBSC 7 and VOIP-BS 9, where the analog phone is connected. As previously described, MSC 6 forwards the call with a caller ID like "858 123 4567 for 858 555 6666", informing analog telephone 11 which number called and for which mobile number the call is. If the mobile is active and there is no trigger event or other reason to forward to the VoIP-BS, the call is forwarded to a regular base station (e.g. base station 4 of FIG. 1) and on to the mobile device.

Figure 3:
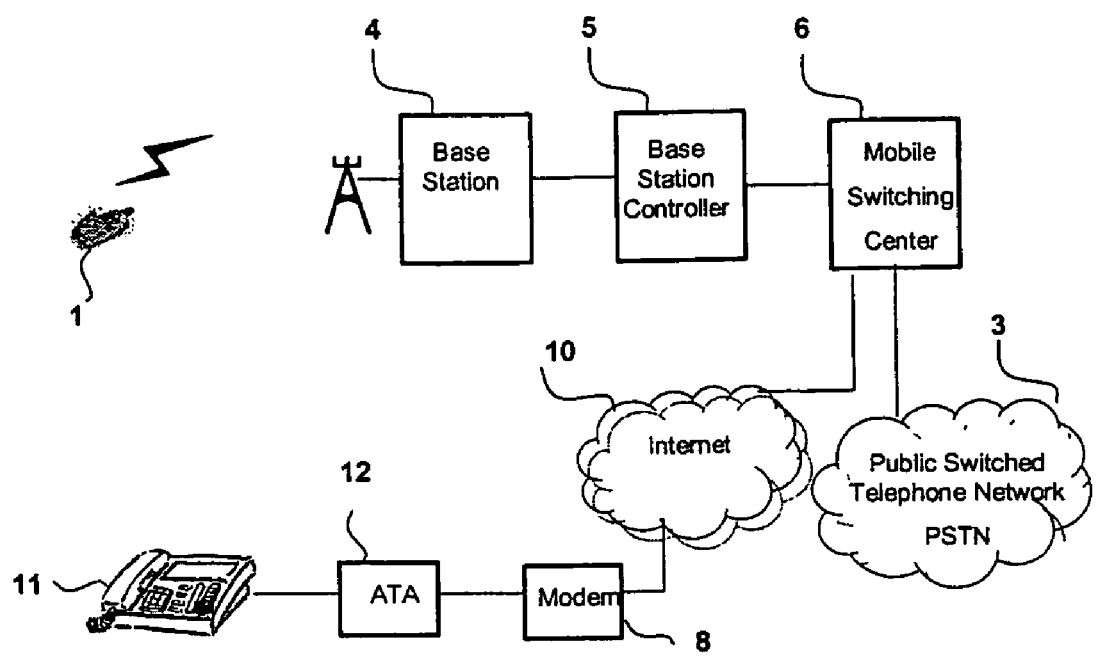
FIG. 3 is a diagram of another embodiment of a telecommunications network according to the present invention.

FIG. 3 shows an alternative network where calls to and from mobile 1 are routed through MSC 6, base station controller (BSC) 5 and to base station 4. If call forwarding is activated, calls for mobile 1 are forwarded through the Internet 10 to broadband modem 8 and ATA 12. ATA 12 is connected to a regular analog phone 11. Alternatively, ATA 12 has digital output to permit connection of IP or ISDN phones. If the subscriber wants to make a call from his analog phone 11, the call is routed through the Internet to MSC 6. MSC 6 inserts the identification information of mobile 1, so that it appears to others that the call is actually coming from mobile 1, rather than from analog phone 11.

Other embodiments and implementations of the invention will be or will become apparent to one with skill in the art. All such additional embodiments and implementations are intended to be included within this description, to be within the scope of the invention and to be accompanying claims.

The invention claimed is:

1. A network comprising:
   a telephone adaptor (TA) to communicably couple with at least one wire line telephone; and
   a base station having a broadband modem to communicate with a mobile station, to communicably couple with the TA, and to communicably couple with the Internet via the broadband modem;
   wherein the base station to convey a phone call between the mobile station or the TA and a wireless network via the Internet according to a Voice Over Internet Protocol (VoIP) technique, and further wherein the base station, for outgoing calls, distinguishes between different phone numbers and provides information to identify a selected phone number as an originating phone number and provides the originating phone number to a recipient of the phone call by providing a different identifier for the mobile device than used for the wire line.

2. The network of claim 1 further comprising an internet base station controller (iBSC) to communicably couple with the Internet and with the wireless network;
   wherein the iBSC to convey the phone call between the Internet and the wireless network.

3. The network of claim 1, further comprising:
a mobile switching center (MSC), of the wireless network, to be communicably coupled with the Internet and to forward a second phone call, that is directed to the mobile station, from the wireless network to the base station via the Internet.

4. The network of claim 3, further comprising an internet base station controller (iBSC) to be communicably coupled with the MSC and with the Internet;
wherein the iBSC to convey the second phone call from the MSC to the base station via the Internet.

5. The network of claim 1, wherein the TA to communicably couple with a digital wire line telephone.

6. The network of claim 1, wherein the TA and the base station are integrated into a single device.

7. The network of claim 1, wherein the base station to communicably couple to the Internet at a location in a home or office.

8. The network of claim 1, wherein the base station to communicate with two or more mobile stations by using different caller ID content.

9. A network comprising:
a telephone adapter (TA) to communicably couple with at least one telephone with the Internet via a broadband modem; and
one of a mobile switching center (MSC) or a Voice-over-Internet Protocol (VOIP) gateway, of a wireless network, to couple with the Internet;
wherein, the TA to convey a phone call between the telephone and the MSC or VOIP gateway via the Internet, and further wherein the MSC or VOIP guateway, for outgoing calls, distinguishes between different phone numbers and provides information to identify a selected phone number as an originating phone number and provides the originating phone number to a recipient of the phone call where an identifier provided for a call originating from the MSC or VOIP gateway is different than an identifier provided for a call originating from the telephone.

10. The network of claim 9, wherein the MSC or the VOIP gateway to forward a phone call, that is directed to a mobile station, from the wireless network to the TA via the Internet.

11. The network of claim 9, wherein the TA provides multiple digital or analog outputs for connection with multiple wired digital or analog telephones.

12. The network of claim 9, wherein the TA can handle multiple mobile telephones by using different caller ID content and/or different prefixes for outgoing calls for the fixed telephones.

13. A method comprising:
communicably coupling a telephone adaptor (TA) with at least one wire line telephone;
communicably coupling a base station with a plurality of mobile stations, with the TA, and with the Internet via a broadband modem, wherein each mobile station and the TA correspond to a different telephone number; and
with the base station, conveying an outgoing phone call between a selected mobile station or the TA using a Voice over Internet Protocol (VoIP) standard and a wireless network via the Internet, wherein the base station determines a telephone number corresponding to a source of the phone call and provides the determined telephone number as the originator of the phone call where an identifier provided for a call originating from the MSC or VOIP gateway is different than an identifier provided for a call originating from the wire line telephone.

14. The method of claim 13, further comprising:
communicably coupling a mobile switching center (MSC), of the wireless network with the Internet; and
forwarding a second phone call, that is directed to the mobile station, from the wireless network to the base station via the Internet.

15. The method of claim 14, further comprising:
communicably coupling an internet base station controller (iBSC) with the MSC and with the Internet; and
with the iBSC, conveying the second phone call from the MSC to the base station via the Internet.

* * * * *